United States Patent
Liu et al.

(10) Patent No.: US 9,771,949 B2
(45) Date of Patent: Sep. 26, 2017

(54) GUARD FOR A ROTARY PUMP

(71) Applicant: WEIR MINERALS AUSTRALIA LTD, Artarmon, New South Wales (AU)

(72) Inventors: Wen-Jie Liu, Epping (AU); Nathan Reid, Lane Cove North (AU)

(73) Assignee: Weir Minerals Australia LTD, New South Wales (AU)

( * ) Notice: Subject to any disclaimer, the term of this patent is extended or adjusted under 35 U.S.C. 154(b) by 576 days.

(21) Appl. No.: 14/365,246

(22) PCT Filed: Dec. 19, 2012

(86) PCT No.: PCT/AU2012/001562
§ 371 (c)(1),
(2) Date: Jun. 13, 2014

(87) PCT Pub. No.: WO2013/090998
PCT Pub. Date: Jun. 27, 2013

(65) Prior Publication Data
US 2014/0369817 A1    Dec. 18, 2014

(30) Foreign Application Priority Data

Dec. 19, 2011 (AU) ................................ 2011905281
Feb. 24, 2012 (AU) ................................ 2012900693

(51) Int. Cl.
*F04D 29/40*  (2006.01)
*F04D 15/00*  (2006.01)
(Continued)

(52) U.S. Cl.
CPC ....... *F04D 29/406* (2013.01); *F04D 15/0077* (2013.01); *F04D 29/086* (2013.01);
(Continued)

(58) Field of Classification Search
CPC .... F04D 29/406; F04D 29/086; F04D 29/106; F04D 29/605; F04D 15/0077; F16P 1/02
(Continued)

(56) References Cited

U.S. PATENT DOCUMENTS

| 2,283,348 A | 5/1942 | Adams et al. |
| 7,520,816 B1 | 4/2009 | Brisk |
| 9,322,412 B2 * | 4/2016 | Dewsnap .............. F04D 29/106 |

FOREIGN PATENT DOCUMENTS

| AU | 2008207607 A1 | 7/2009 |
| CN | 201606303 U | 10/2010 |

(Continued)

OTHER PUBLICATIONS

Espacenet English Abstract of JP 9324793 (Dec. 16, 1997).
(Continued)

*Primary Examiner* — Richard Edgar
(74) *Attorney, Agent, or Firm* — Gardere Wynne Sewell LLP

(57) ABSTRACT

Guards for rotary pumps are described, the pump having a main body and further including an impeller housing and a driveshaft extending between the main body of the pump and the impeller housing; the pump further including an adjustable sealing arrangement provided at a region where the driveshaft enters the impeller housing, the guard provides access to adjust the sealing arrangement but obstructs access to the driveshaft.

18 Claims, 17 Drawing Sheets

(51) Int. Cl.
  *F04D 29/08* (2006.01)
  *F04D 29/60* (2006.01)
  *F04D 29/10* (2006.01)
  *F16P 1/02* (2006.01)

(52) U.S. Cl.
  CPC ......... *F04D 29/106* (2013.01); *F04D 29/605* (2013.01); *F16P 1/02* (2013.01); *F05D 2230/80* (2013.01); *Y10T 29/49238* (2015.01)

(58) Field of Classification Search
  USPC .................................................. 416/247 R
  See application file for complete search history.

(56) References Cited

FOREIGN PATENT DOCUMENTS

| | | |
|---|---|---|
| DE | 20004773 U1 | 5/2000 |
| JP | H08-100797 A | 4/1996 |
| JP | 9324793 A | 12/1997 |
| WO | WO-2013/090998 A1 | 6/2013 |

OTHER PUBLICATIONS

International Search Report of PCT/AU2012/001562, dated Mar. 12, 2013.
International Preliminary Report on Patentability of PCT/AU2012/001562, dated May 21, 2013.
European search report of EP Application No. 12860940.1, dated Jul. 28, 2015.
Espacenet English Abstract of JPH08100797 (Apr. 16, 1996).

* cited by examiner

GUARD FOR A ROTARY PUMP

TECHNICAL FIELD

This invention relates to guards used with machines to prevent injury to operators of the machinery. The invention has particular application to rotary pumps.

BACKGROUND

Operators of machines face the risk of injury by coming into contact with moving parts of the machine. For instance, if the hair or clothing of a machine operator were to become entangled with a moving part such as a rotating shaft, then the hair or clothing of the operator may quickly become quickly wrapped around the shaft and the operator can be quickly dragged towards and into contact with moving parts of the machine, which can give rise to very serious injuries. This risk exists during normal operation of the machine and whilst making maintenance inspections or adjustments.

To reduce the risk of injury to machine operators or maintenance workers, a machine may be fitted with guards which obstruct access to moving parts. This can present an inconvenience to machine operators or maintenance workers, as sometimes it is necessary to remove the guard to carry out routine inspections or maintenance. Unfortunately, it has been found that in practice some guards are sometimes not refitted after removal, and consequently the protection offered by the guard is then lost and the risk of injury during the future operation of the machine is increased.

Rotary pumps typically comprise a bearing housing and an impeller housing, with a driveshaft extending between the bearing housing and the impeller housing. An adjustable gland seal is provided at the region where the driveshaft enters the impeller housing. The function of the gland seal is to resist escape of pumping medium, such as a slurry or liquid, from the pump whilst allowing for rotation of the driveshaft which supports and drives an impeller located inside the impeller housing. The gland seal is often provided with its own pressurised water supply and some amount of leakage of water or other fluid is normal during operation of the pump.

The gland seal typically includes some type of packing material which becomes compacted or worn over time. This necessitates regular inspection of the rate of leakage from the gland seal and the making of regular adjustments of the degree of compression applied to the packing material which is typically effected by progressive manual tightening of nuts or bolts which hold a gland follower in compressed relation to the packing material.

There remains a need for improved guard arrangements for use in association with the region surrounding the driveshaft and gland seal of a rotary pump.

SUMMARY

In a first aspect embodiments are disclosed of a guard for a rotary pump, the pump having a main body and further including an impeller housing and a driveshaft extending between the main body of the pump and the impeller housing; the pump further including an adjustable sealing arrangement provided at a region where the driveshaft enters the impeller housing, the guard provides access to adjust the sealing arrangement but obstructs access to the driveshaft.

In certain embodiments the adjustable sealing arrangement can include a gland follower and the guard is arranged to be attached to the gland follower.

In certain embodiments the guard can accommodate changes in the adjustment of the gland follower by way of being formed from at least two guard elements which are arranged to move with respect to one another.

In certain embodiments the main body of the pump can include a pump base and the guard is further arranged to be attached to the pump base and is arranged to accommodate changes in the distance between the gland follower and the pump base.

In certain embodiments the main body of the pump includes a bearing housing and the guard is further arranged to be attached to the bearing housing and is arranged to accommodate changes in the distance between the gland follower and the bearing housing In certain embodiments the guard can be formed from three guard elements which are arranged to move with respect to one another.

In certain embodiments the guard elements can be each comprised of two half-shells which fit together.

In certain embodiments the guard can include apertures to accommodate bolt ends of the adjustable sealing arrangement.

In certain embodiments the guard can include apertures to allow visual inspection of the sealing arrangement.

In a second aspect embodiments are disclosed of a rotary pump including a guard according to any one of the preceding claims.

In a third aspect embodiments are disclosed of a method of retrofitting a guard to a rotary pump including the steps of providing a guard according to the first aspect and installing the guard on the pump.

In a fourth aspect embodiments are disclosed of a rotary pump, the pump having a main body and further including an impeller housing and a driveshaft extending between the main body of the pump and the impeller housing; the pump further including an adjustable sealing arrangement provided at a region where the driveshaft enters the impeller housing, the adjustable sealing arrangement including a gland seal, an adjustable gland follower and bolt ends projecting from the gland follower; the pump further including a guard, the guard provides access to adjust the sealing arrangement but obstructs access to the driveshaft, the guard includes at least two guard elements, one of the elements is attached to the main body of the pump, the other element is attached to the gland follower, and the guard further including apertures to accommodate the bolt ends of the adjustable sealing arrangement.

Other aspects, features, and advantages will become apparent from the following detailed description when taken in conjunction with the accompanying drawings, which are a part of this disclosure and which illustrate, by way of example, principles of the inventions disclosed.

Throughout this specification when the phrase "obstruct access" is used it is intended to mean that the guard is configured to be suitable for blocking the access of a limb, finger, hair or other body part of an operator, or an article of clothing from coming into contact with a moving part of the machine under normal operating conditions.

BRIEF DESCRIPTION OF THE DRAWINGS

An embodiment will now be described, by way of example only, with reference to the accompanying drawings, in which.

DETAILED DESCRIPTION

It will be convenient to describe the various components of an embodiment of the guard and then show these components assembled together in association with a rotary pump.

Figure 1:
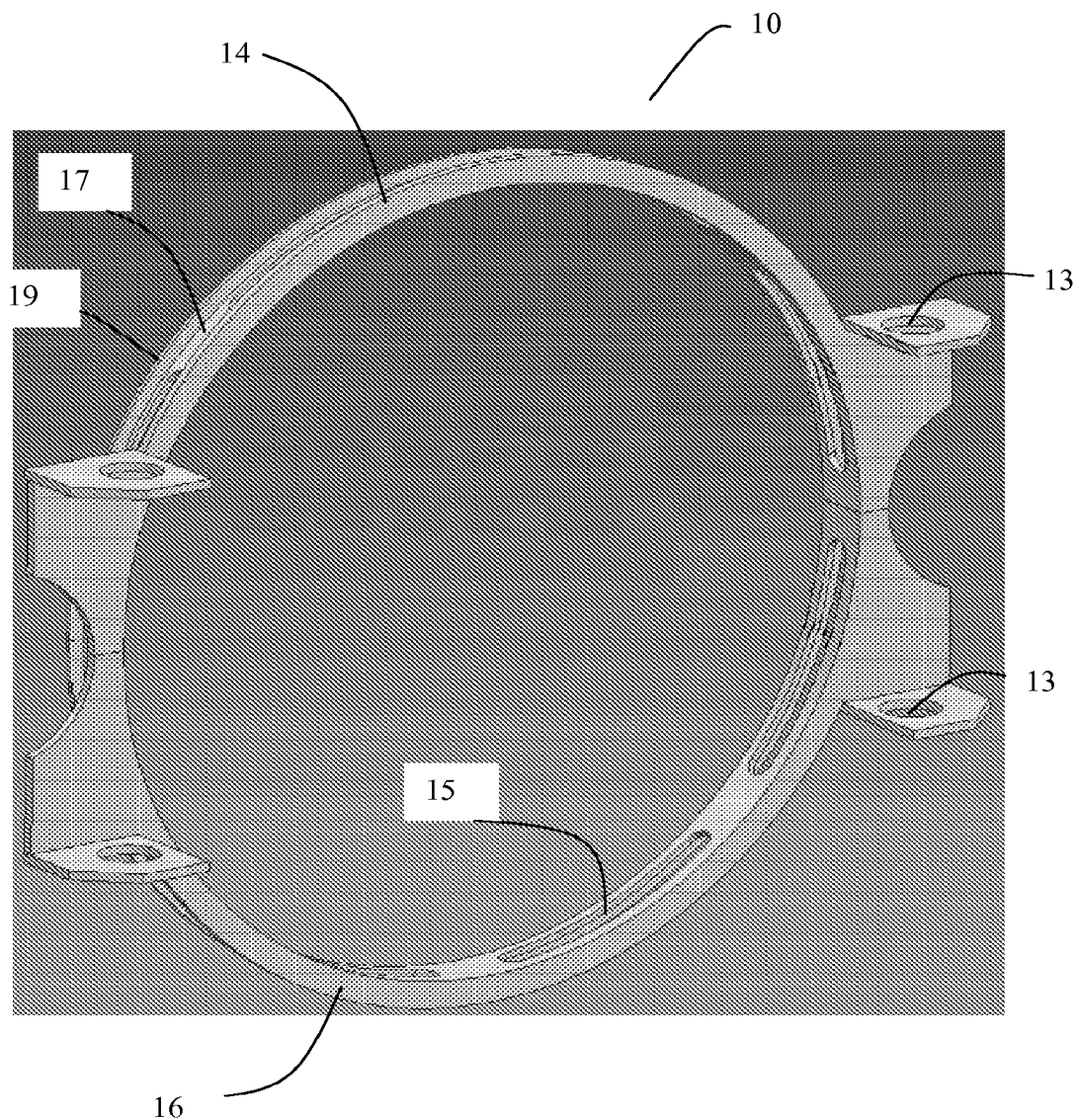
FIG. 1 is a perspective view of the first element of an embodiment of a guard.

Referring to FIG. 1, a first guard element 10 is shown which is formed from two half-shells 14, 16. The first element 10 is arranged to be affixed to the gland follower of an adjustable seal arrangement of a rotary pump by way of inserting bolts through the apertures 13, to be received in threaded apertures provided in the gland follower. Inspection apertures 15 allow for visual inspection of the seal arrangement through the guard and for escape of liquids. The first element 10 includes an annular recess 17 and a lip 19 which cooperate with a third guard element as will be later described.

Figure 2:
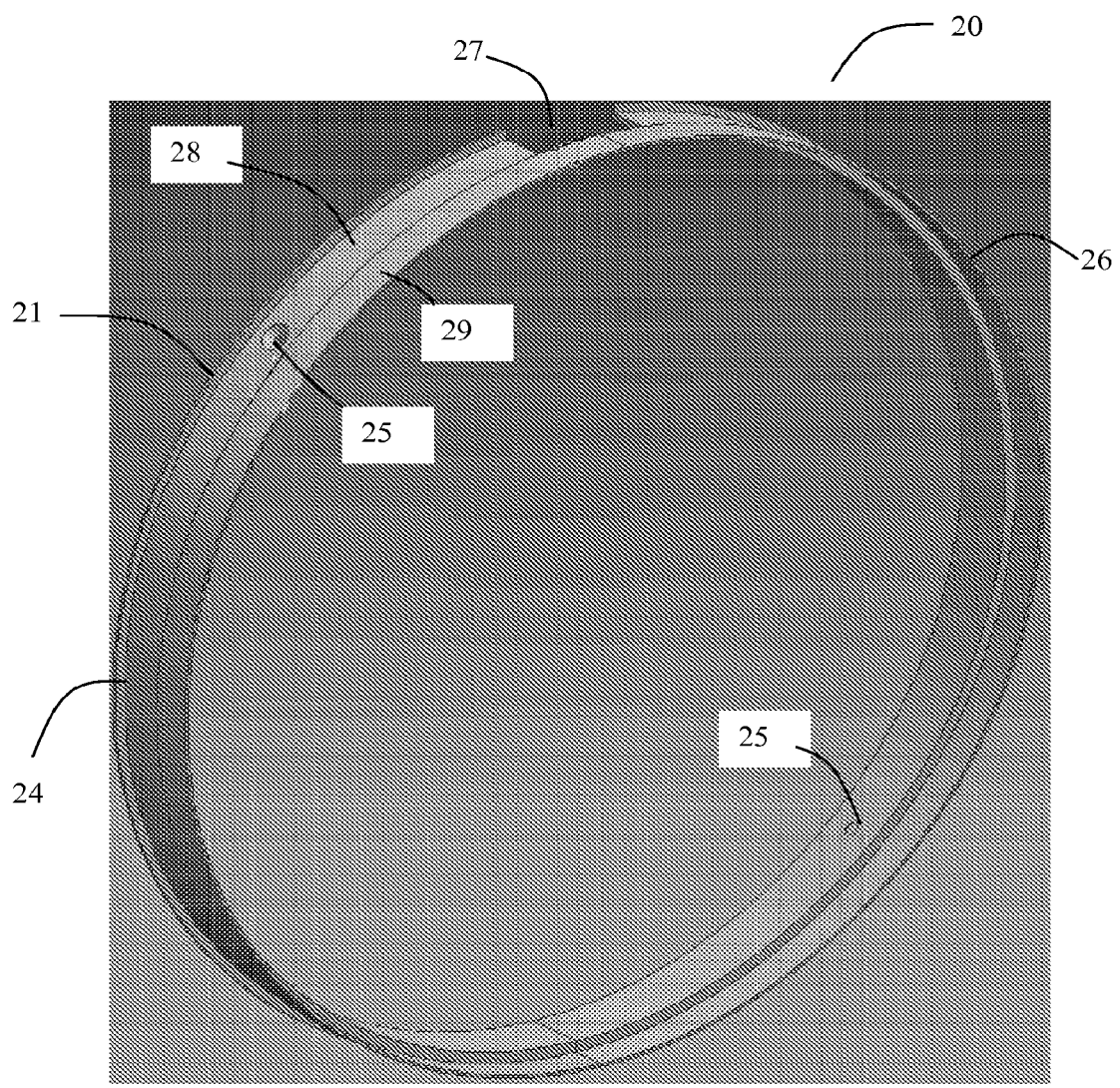
FIG. 2 is a perspective view of the second element of the guard.

Referring to FIG. 2, a second guard element 20 is shown which is formed from two half-shells 24, 26. The second element 20 is arranged to be fitted around the end region of the bearing housing of a rotary pump and is affixed by way of countersunk bolts inserted through the apertures 25, to be received in threaded apertures in the bearing housing. When the two halves 24, 26 are brought together, an opening 27 is created which in use accommodates a grease nipple which is mounted at the upper region of the bearing housing. The second element 20 includes an annular recess 28, and a flange 29 which cooperate with the third guard element as will be later described.

Figure 3:
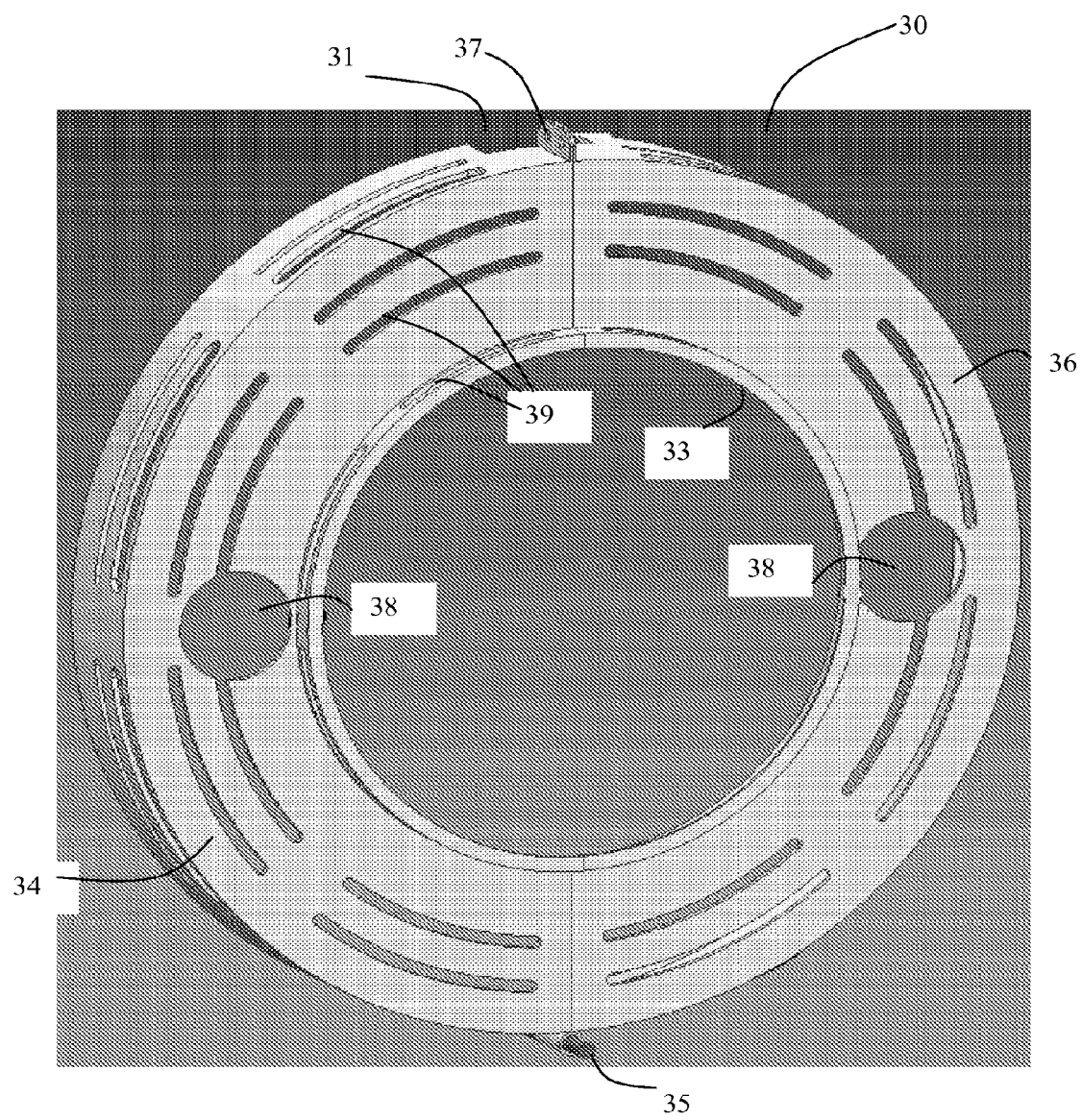
FIG. 3 is a perspective view of the third element of the guard.
Figure 4:
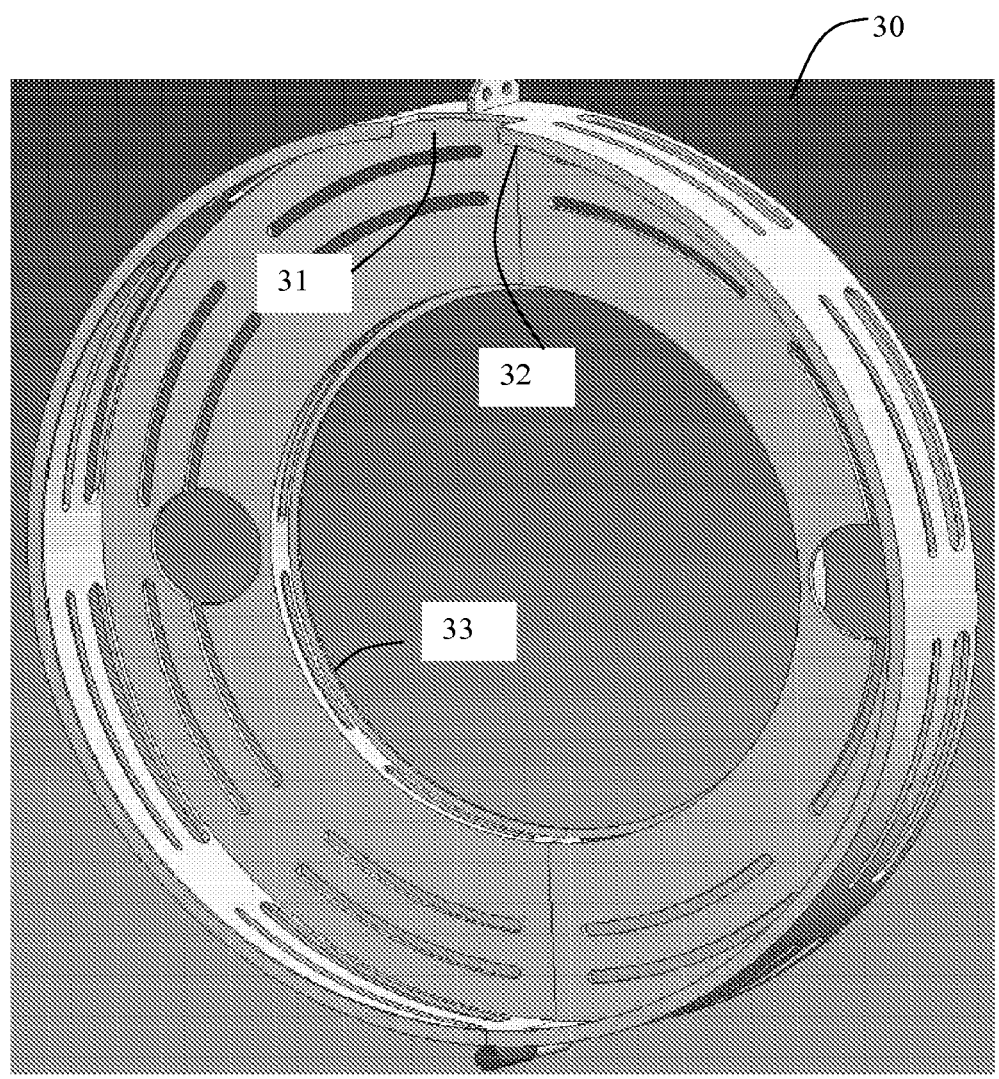
FIG. 4 is a reverse perspective view of the element of FIG. 3.

Referring to FIGS. 3 and 4, a third guard element 30 is shown which is formed from two half-shells 34, 36. The two halves 34, 36 are attached together at one side by way of a pivot pin 35, and at the other side by way of inserting M4 bolts through bolt holes 37 to clamp the halves 34, 36 together. The third element 30 includes two apertures 38 which in use accommodate the ends of threaded rods and nuts which form part of an adjustable seal arrangement, as will be later described. Inspection apertures 39 allow for visual inspection of the adjustable seal arrangement through the guard and for the escape of liquids. The third element includes a first lip 33 which cooperates with the annular recess 17 of the first element 10 and a second lip 32 (best seen in FIG. 4) which cooperates with the annular recess 28 of the second element 20 as will be later described. An opening 31 is provided which accommodates the grease nipple.

Figure 5:
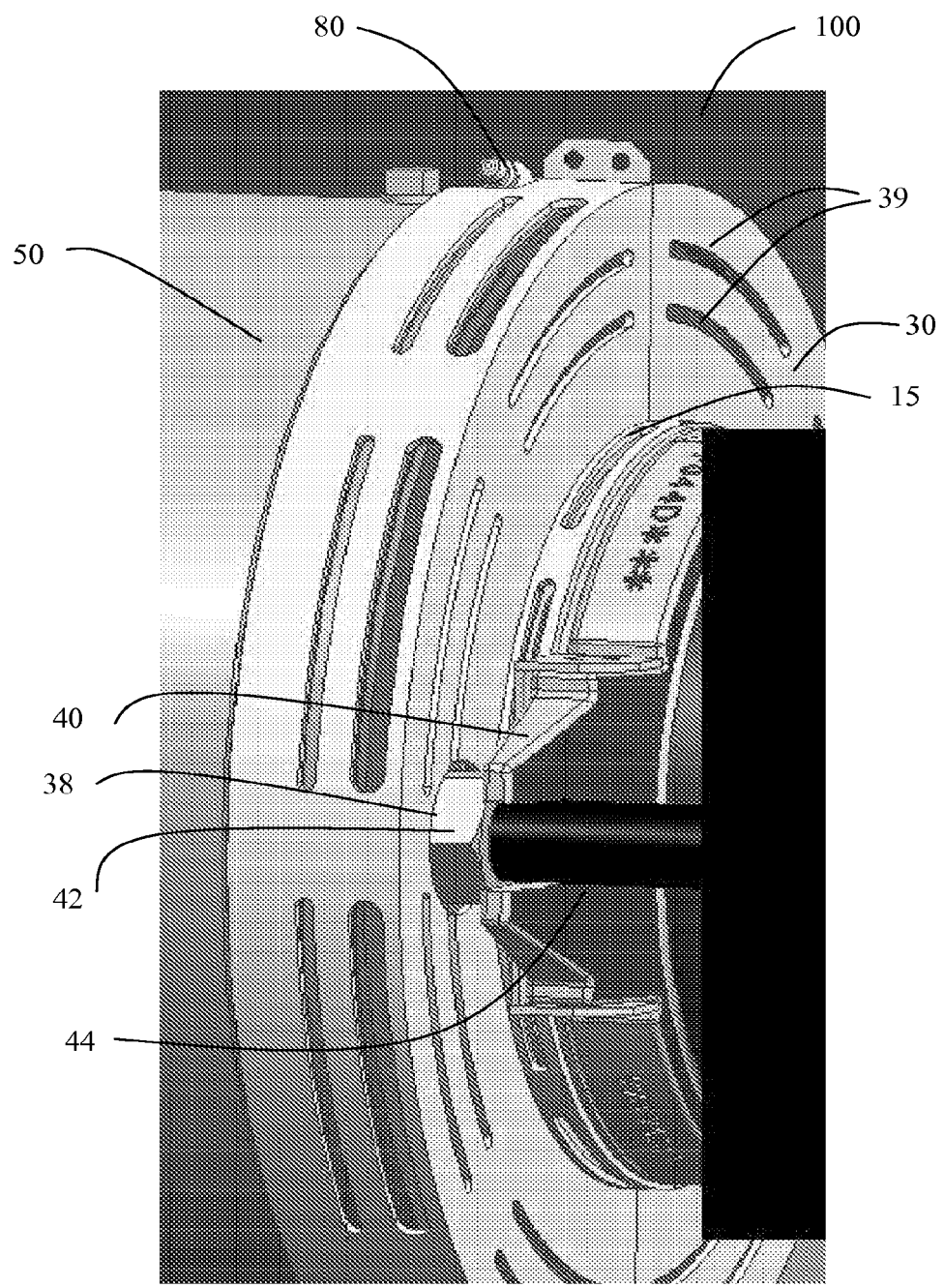
FIG. 5 is a perspective view showing the guard installed on a rotary pump.
Figure 6:
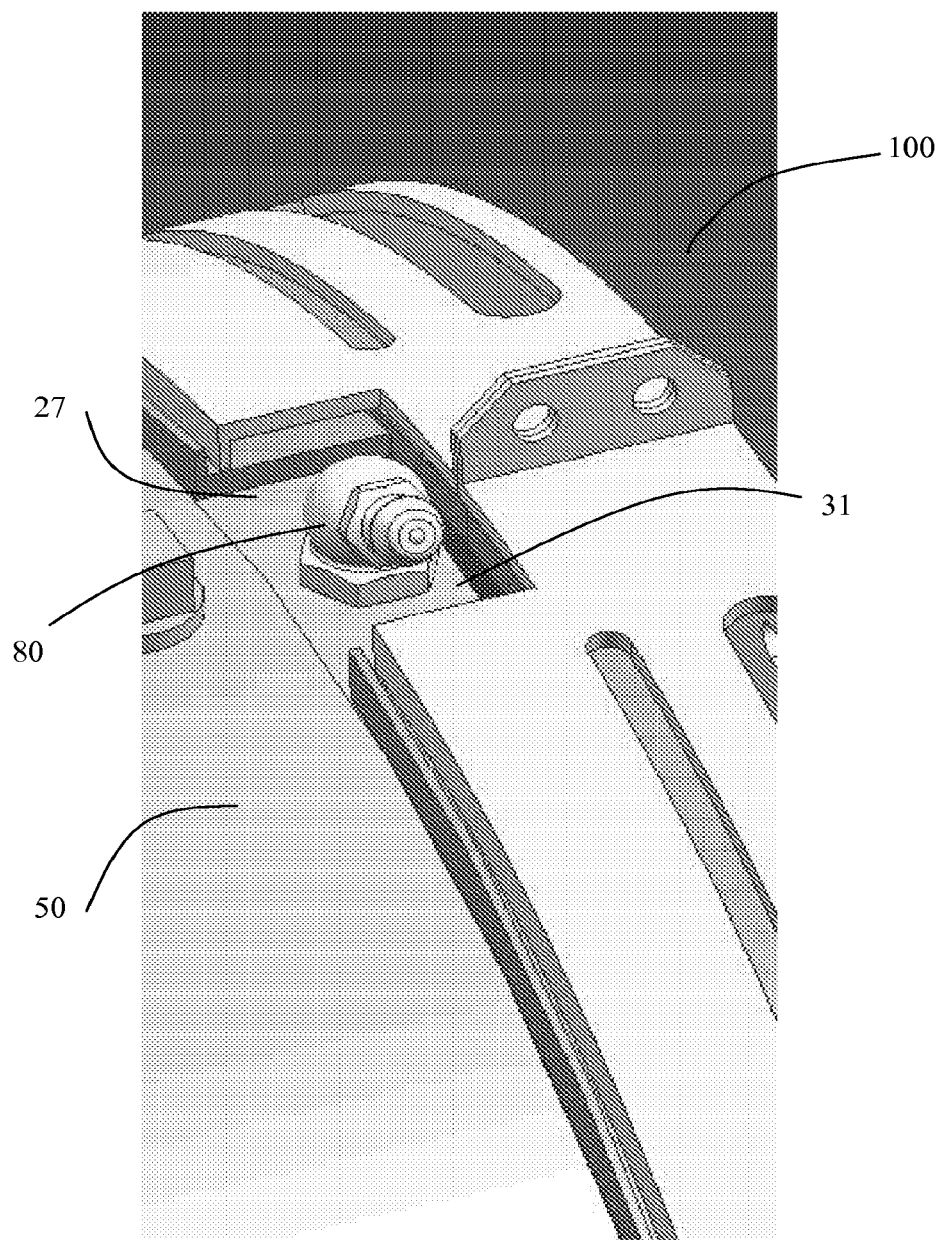
FIG. 6 is another perspective view showing the guard installed on the pump.

Referring to FIGS. 5 and 6, the guard 100 formed from the first 10, second 20 and third 30 guard elements has been installed on a rotary pump in the following manner:

a) The two halves 14, 16 of the first element 10 are attached to respective upper and lower sides of the gland follower 40 by way of inserting bolts (not shown) through the apertures 13, to be received in the threaded apertures provided in the gland follower 40.

b) The two halves 24, 26 of the second element 20 are attached to respective left and right sides of the bearing housing 50 by way of inserting countersunk bolts through apertures 25, to be received in threaded apertures provided in the bearing housing (not visible).

c) The two halves 34, 36 of the third element 30 are joined at one side by way of a pivot pin 35 and are rotated apart. The two halves 34, 36 are then offered up and closed together about the first 10 and second 20 elements so that the lip 33 sits in the annular recess 17 of the first element 10 and the lip 32 sits in the annular recess 28 of the second element 20. M4 bolts are inserted through the bolt holes 37 to clamp the halves 34, 36 together and the assembly of the guard 100 is complete.

Referring to FIG. 6, a grease nipple 80 is provided on the bearing housing. This is accommodated by openings 27, 31.

Referring again to FIG. 5, the guard 100 allows visual inspection of the gland seal through inspection apertures 15, 39 whilst at the same time obstructing access to the driveshaft 70 (visible in FIG. 7) to prevent injury to the pump operator. Furthermore, it can be seen that the nuts 42, which are mounted on the threaded rods 44, which are used to adjust the compression applied by the gland follower 40 of the gland seal, remain accessible for adjustment with a spanner or the like whilst the guard is installed on the pump. Therefore, the gland seal can be adjusted without the need to remove the guard 100 or shut down the pump.

In FIG. 5, one nut 42 is visible. Another identical nut 42 and a threaded rod 44 are provided on the hidden side of the gland follower 40. The ends of the threaded rods 44 and, to some extent, the nuts 42 are accommodated in the recesses 38.

Over a period of time, the distance between the gland follower and the bearing housing gradually increases as the packing material is worn away and the nuts 42 holding the gland follower 40 are progressively tightened. Movement of the gland follower by a distance of about 2 to 4 centimetres over time is not unusual. Furthermore, this distance may also change if the position of the impeller in the housing is adjusted by way of lateral adjustment of the position of the driveshaft with respect to the bearing housing, or adjustment of the position of the impeller housing with respect to the driveshaft, depending upon the configuration of the pump. Such adjustments may be made as a result of wear of the impeller, or in the event of replacement of an impeller, to provide appropriate clearance between the face of the impeller and the inner surface of the impeller housing to achieve optimum pumping performance. The guard 100 accommodates such changes in distance by way of being able to move in a telescopic fashion as will now be described.

Figure 7:
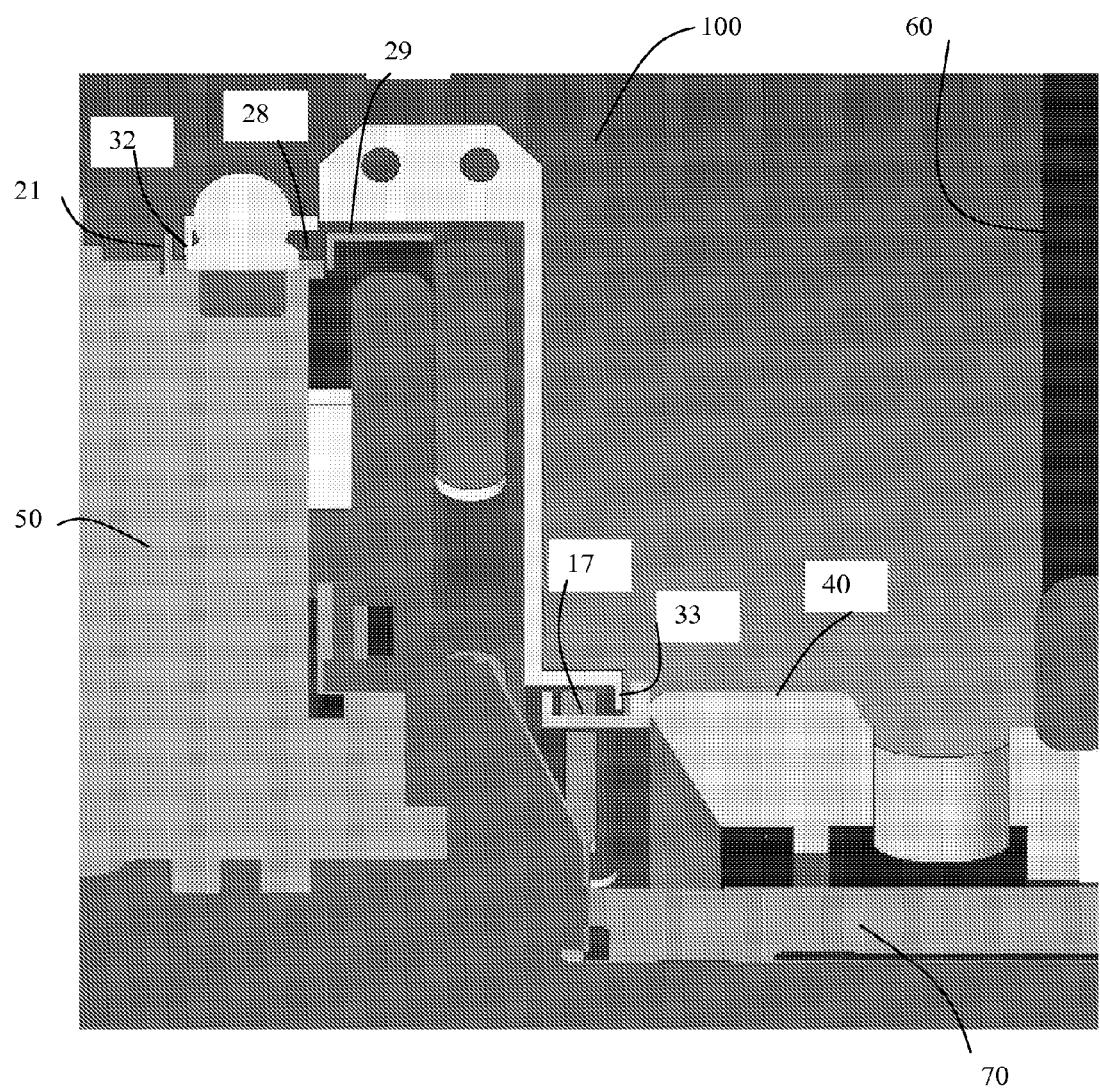
FIG. 7 is a cross-sectional view of the arrangement of FIG. 5 showing the guard in the collapsed configuration.

Referring to FIG. 7, it can be seen that lip 32 of the third element 30 is sitting to the left-hand side (as depicted in the figure) of the annular recess 28 of the second element 20, and the lip 33 of third element 30 is sitting to the right-hand side of the annular recess 17 of first element 10. The guard 100 is thus in a collapsed configuration as would be the case if the packing material in the gland seal had been recently replaced. The freedom of movement of the third element 30 with respect to the second element 20 in the collapsed configuration is limited by the lip 21, thus ensuring adequate clearance between the inside face of the third element 30 and the rotating driveshaft 70 assembly.

Over time, gland follower 40 will move progressively in a direction to the right as shown in the drawing as the packing material is compacted and worn, and the gland follower nuts 42 are progressively tightened.

Figure 8:
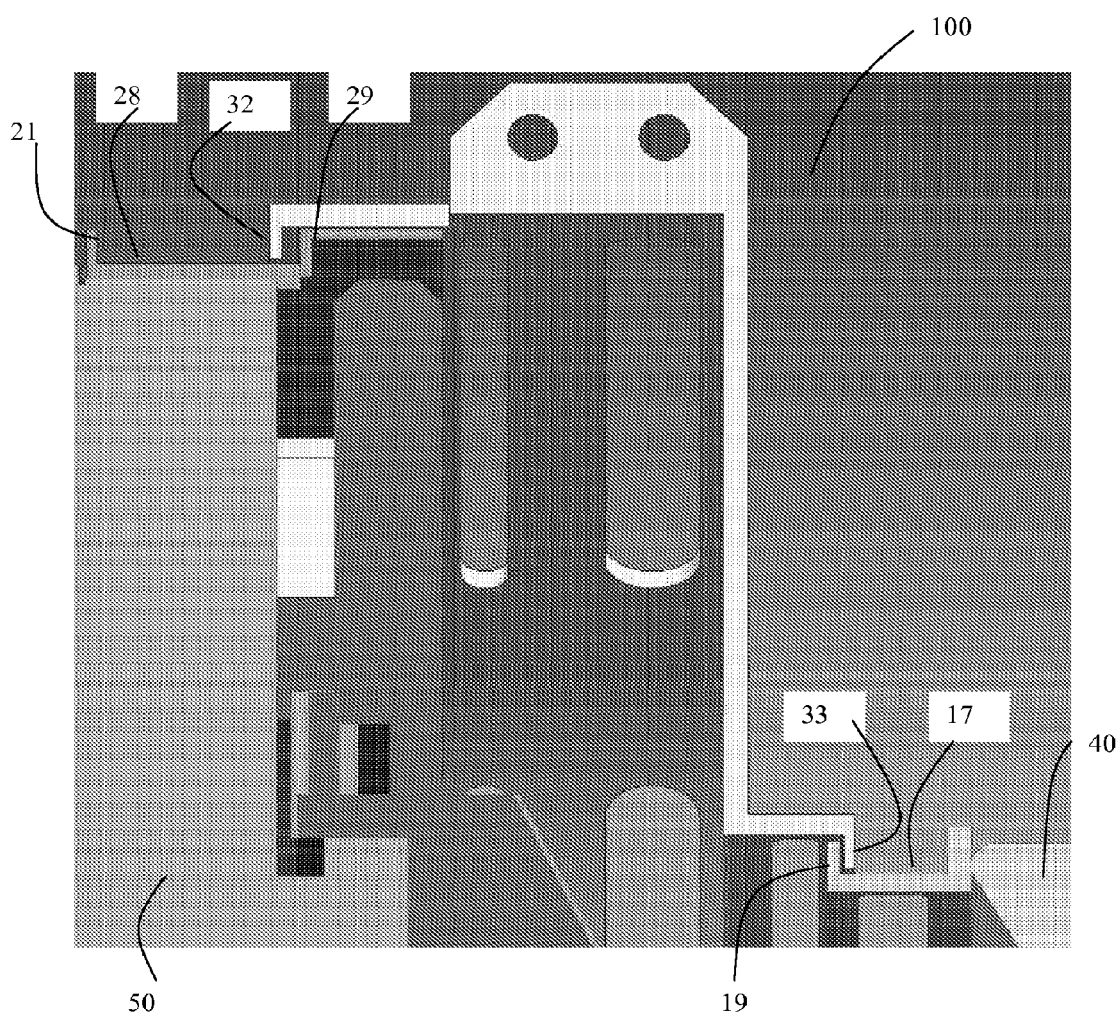
FIG. 8 is another cross-sectional view of the arrangement of FIG. 5 showing the guard in the expanded configuration.
Figure 9:
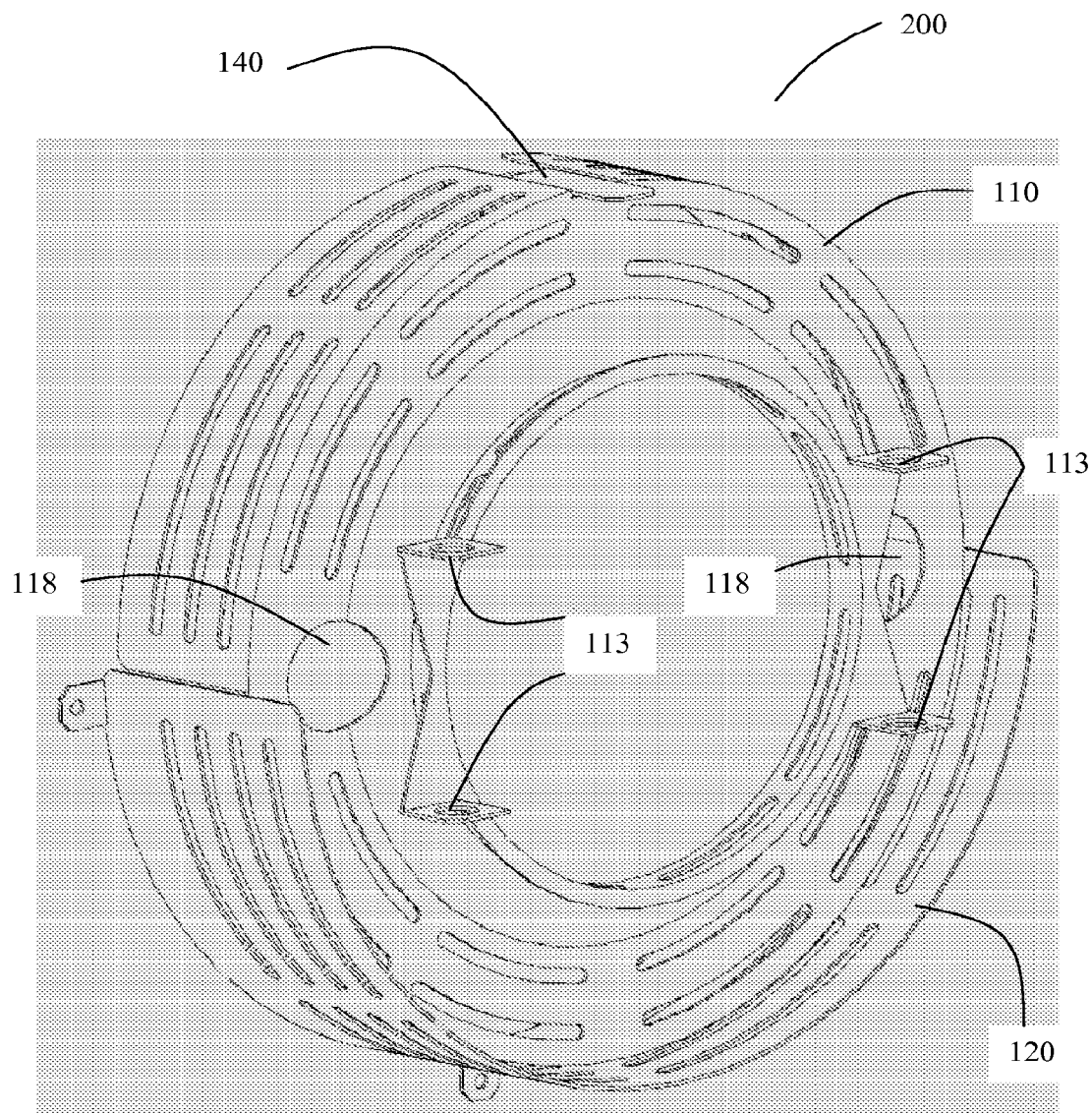
FIG. 9 is a perspective view of a second embodiment of a guard.

Referring to FIG. 8, in this depiction the pump has been in operation for a period of time and adjustments have been made to progressively tighten the gland follower nuts 42. It can be seen that the lip 32 of third element 30 has moved to the right-hand side of the annular recess 28 of the second element 20 and the lip 33 of the third element 30 has moved to the left-hand side of the annular recess 17 of the first element 10. The guard 100 is now in an expanded configuration.

The third element 30 can be said to "float" with respect to the first 10 and second 20 elements. The third element 30 is retained in associated with the first 10 and second 20 elements by way of the cooperation of the lip 33 with the lip 19 of the first element, and by cooperation of the lip 32 with the flange 29 of the second element. The guard 100 obstructs access to the driveshaft by a pump operator over the entire range of relative movement of the guard elements 10, 20 and 30.

Referring to FIGS. 9 to 15, an alternative embodiment of a guard is shown. The guard 200 is comprised of an upper element 110, a lower element 120 and a cover piece 140.

Figure 10:
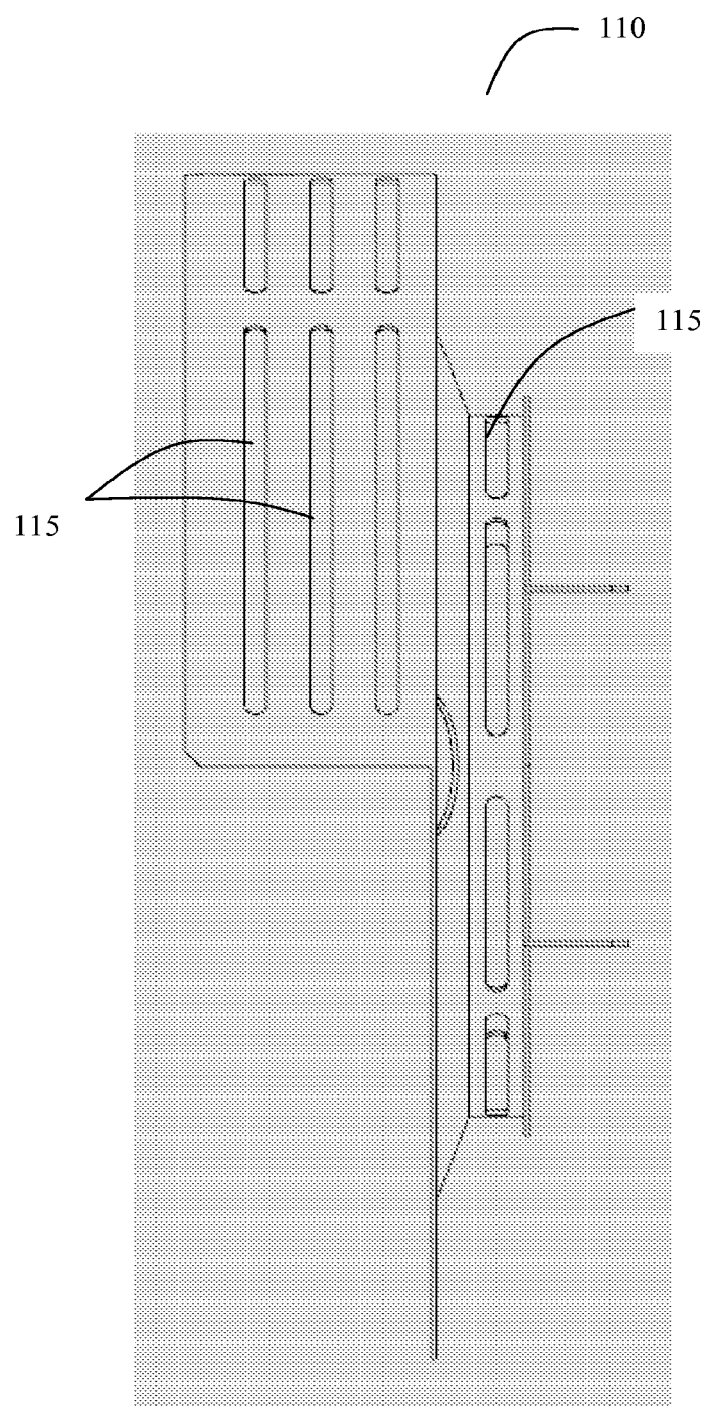
FIG. 10 is a side view of the upper element of the guard of FIG. 9.

The upper element 110 is arranged to be affixed to the gland follower of a rotary pump by way of inserting bolts though the apertures 113 in a similar manner as to the first described embodiment hereinbefore. Referring to FIG. 10, inspection apertures 115 allow for a visual inspection of the seal arrangement of the pump through the guard as well as for the escape of liquids. In use, two apertures 118 accommodate the ends of threaded rods which form part of an adjustable seal arrangement in a somewhat similar fashion as to the first described embodiment.

Figure 11:
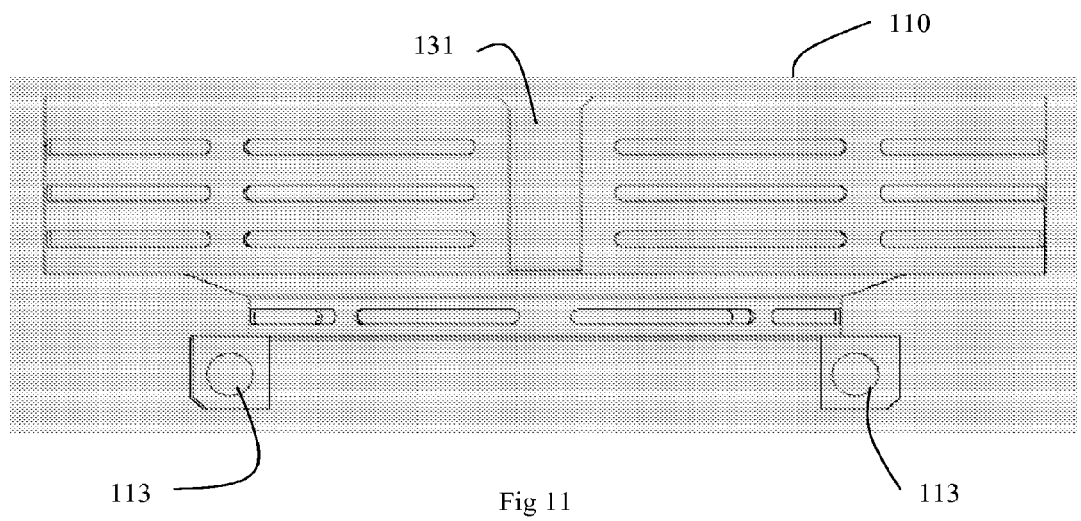
FIG. 11 is a top view of the upper element of FIG. 10.

Referring to FIG. 11, the upper element 110 includes a recess 131 which accommodates a grease nipple when the guard 200 is fitted to a pump.

Figure 12:
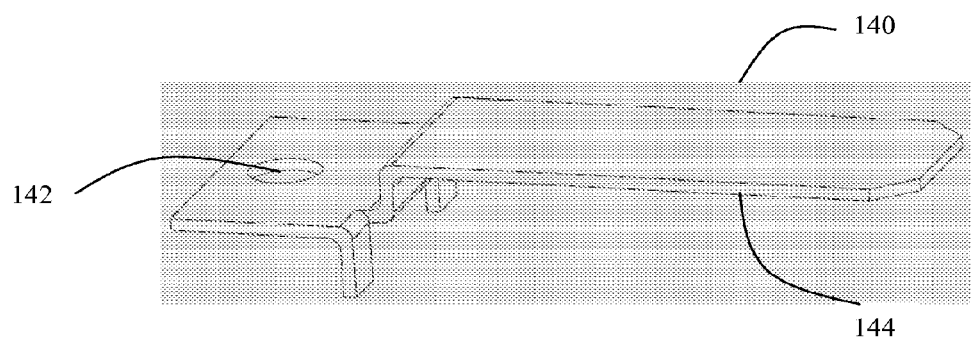
FIG. 12 is a perspective view of the cover piece of the guard of FIG. 9.

Referring to FIG. 12, a cover piece 140 affixes to the bearing housing of a pump in use and is a sliding fit inside a recess 131 of upper element 110. A bracket 140 is affixed to the bearing housing of a pump by way of the grease nipple of the pump.

The stem of the grease nipple is inserted through aperture 142 and tightened to secure the cover plate 140 between the base of the grease nipple and the outer surface of the bearing housing of the pump. A tongue portion 144 sits inside the recess 131 and thus obstructs access to the sealing arrangement through the recess 131.

Figure 13:
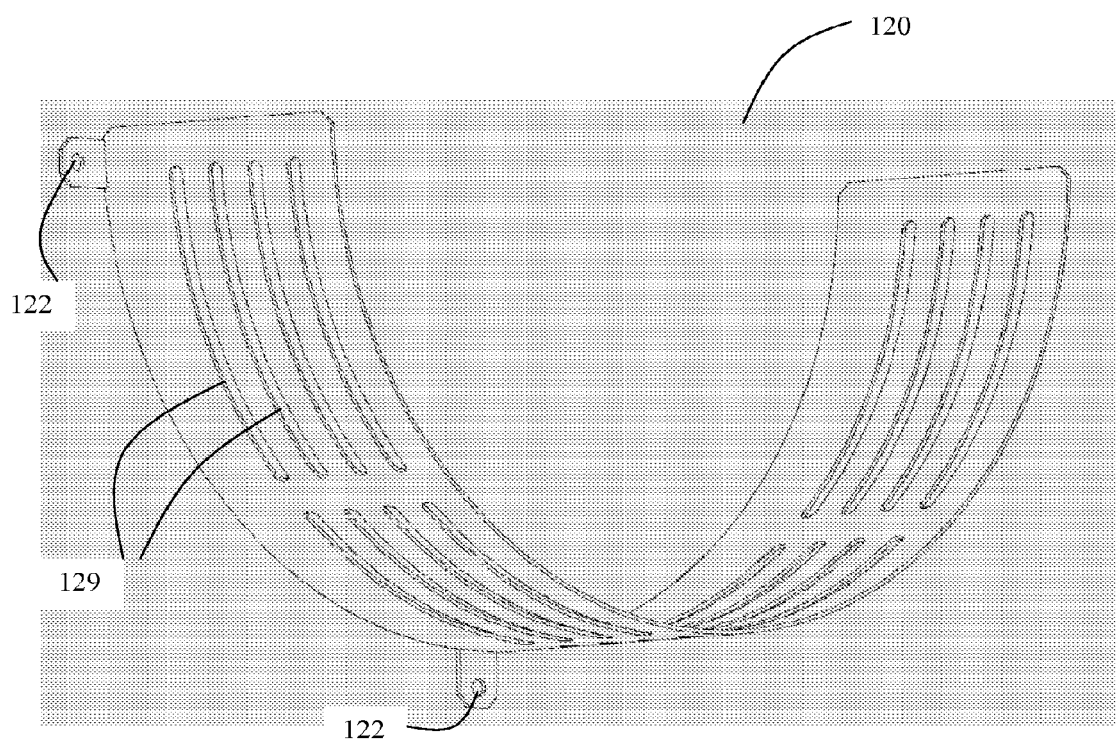
FIG. 13 is a perspective view of the lower element of the guard of FIG. 9.

Referring to FIG. 13, the lower element 120 includes tabs with apertures 122 for affixing to the base of the rotary pump. Inspection apertures 129 allow for inspection of the sealing arrangement from below when the guard 200 is affixed to the rotary pump.

Figure 14:
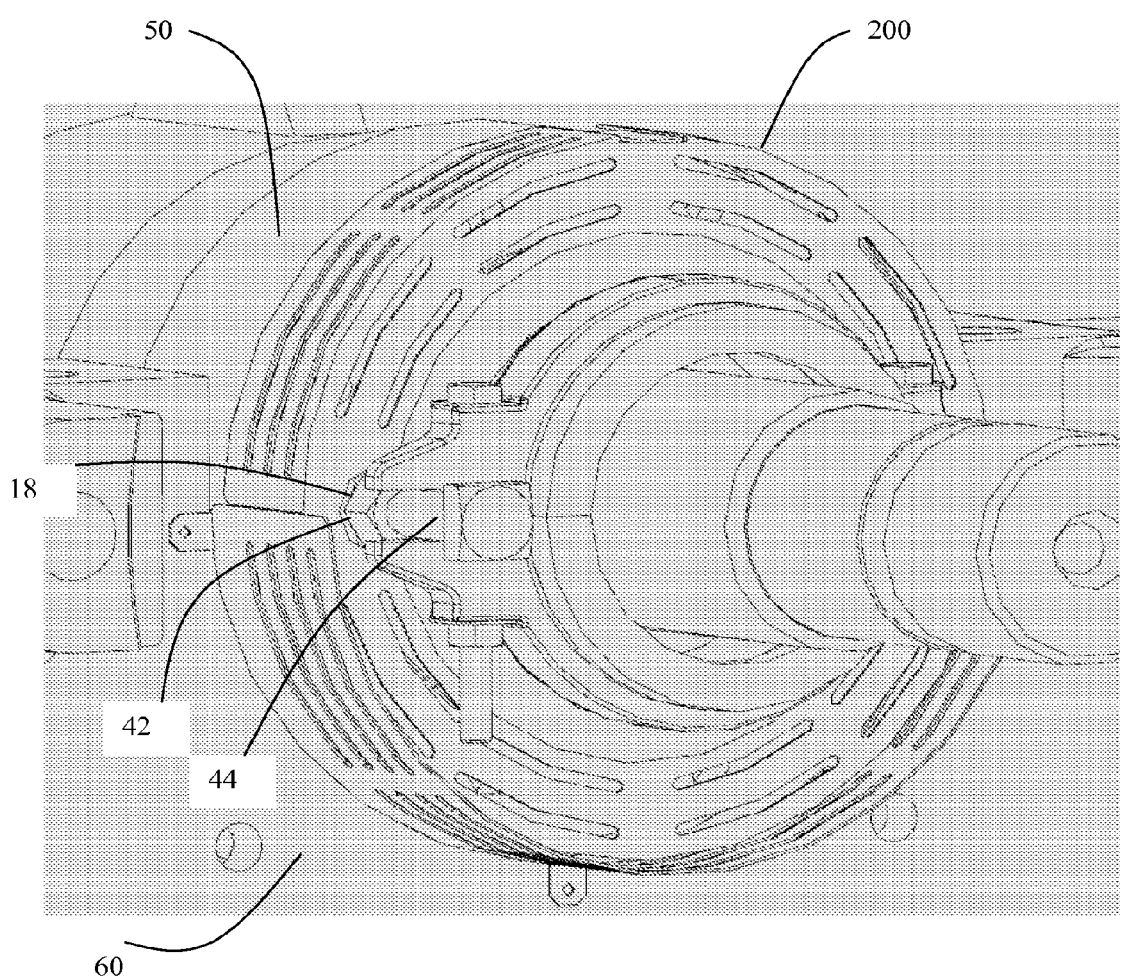
FIG. 14 is a perspective view of the guard of FIG. 9 installed on a rotary pump.

Referring to FIG. 14, the guard 200 is shown affixed to a rotary pump which includes a bearing housing 50 and a pump base 60. As was the case for the first described embodiment hereinabove, the gland seal of the pump is adjusted by way of adjusting nuts 42. The ends of threaded rods 44 are accommodated in the apertures 118.

Figure 15:
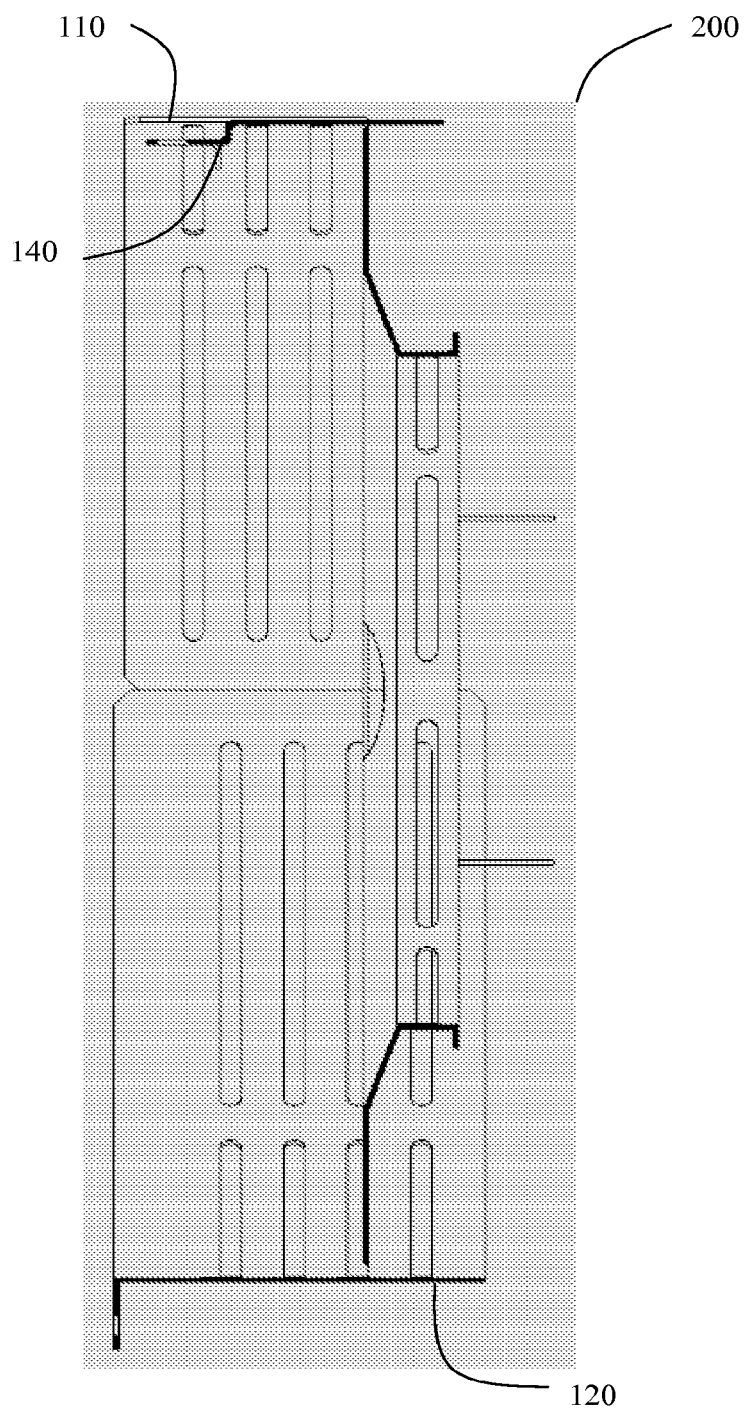
FIG. 15 is a side cross-sectional view along the mid-line of the guard of FIG. 9.

Referring to FIG. 15, the upper portion 110 moves along with the gland follower of the pump, whereas lower portion 120 is affixed to the pump base. As the gland seal is adjusted, the upper 110 and lower 120 elements move in relation to one another to thereby accommodate changes in the distance between the gland follower and the pump base. At all times, nuts 42 are accessible for adjustment by way of a spanner or the like.

Furthermore, as the upper element 110 moves with respect to bearing housing 50, aperture 131 in upper portion 110 remains obstructed by bracket 140. In this way, the cover plate 140 serves to accommodate changes in the distance between the gland follower and the bearing housing.

Figure 16:
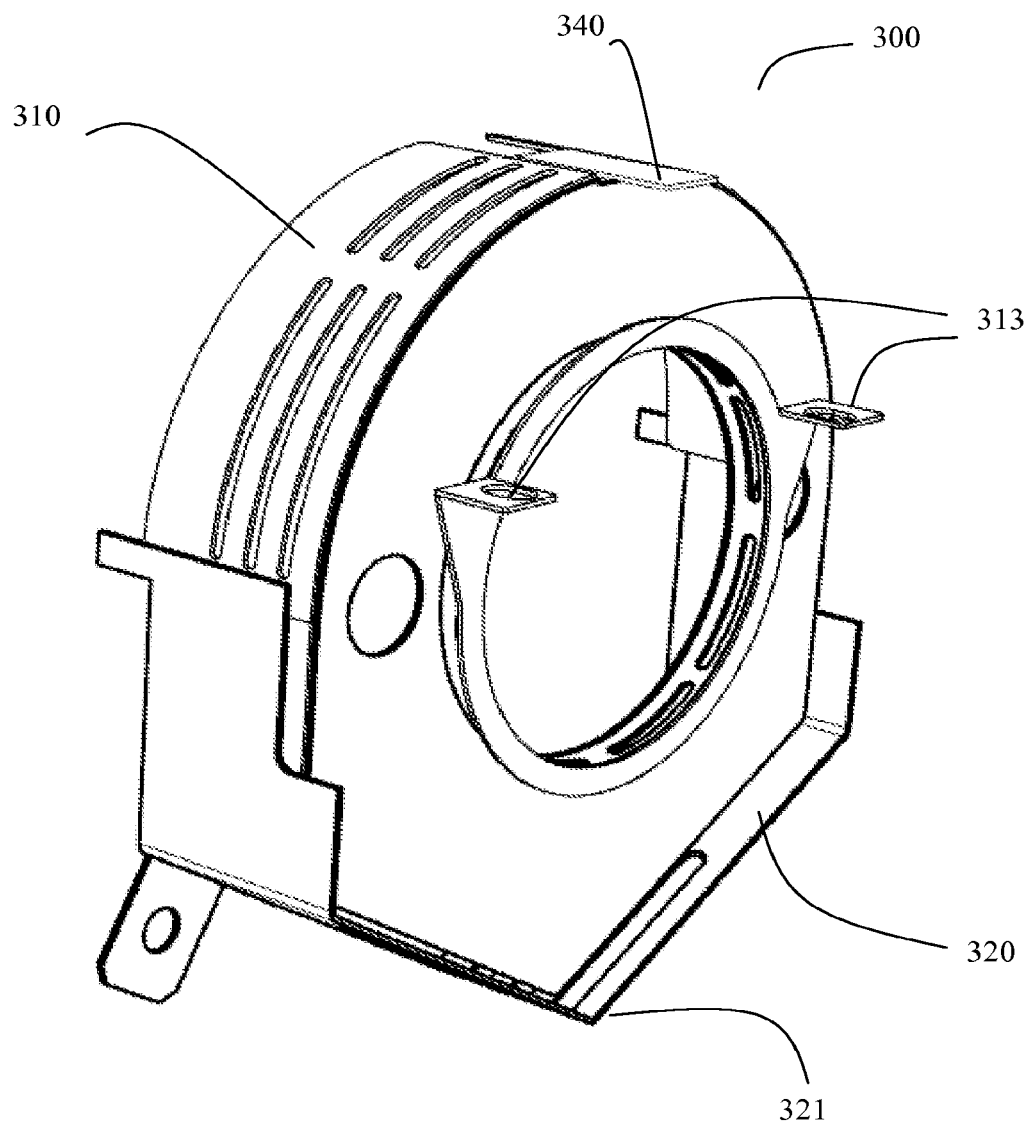
FIG. 16 is a perspective view of a third embodiment of a guard.
Figure 17:
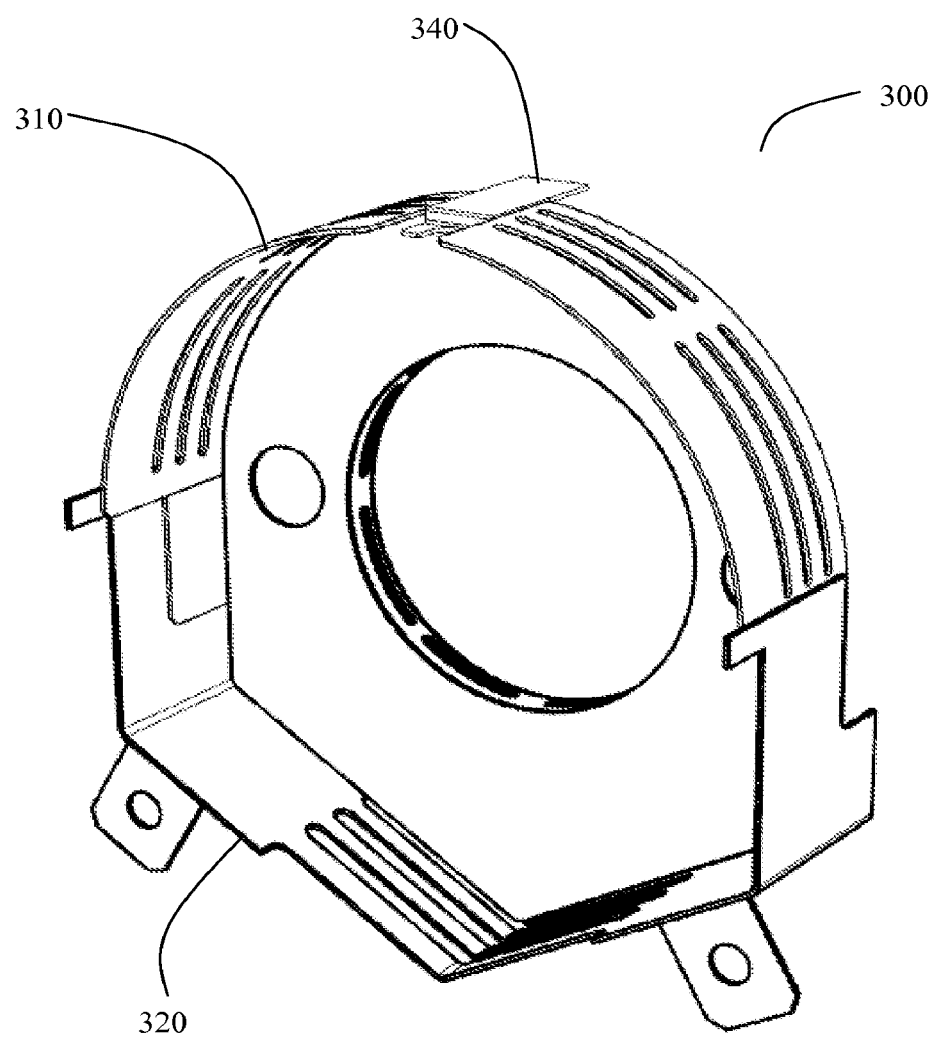
FIG. 17 is a rear perspective view of the guard of FIG. 16.
Figure 18:
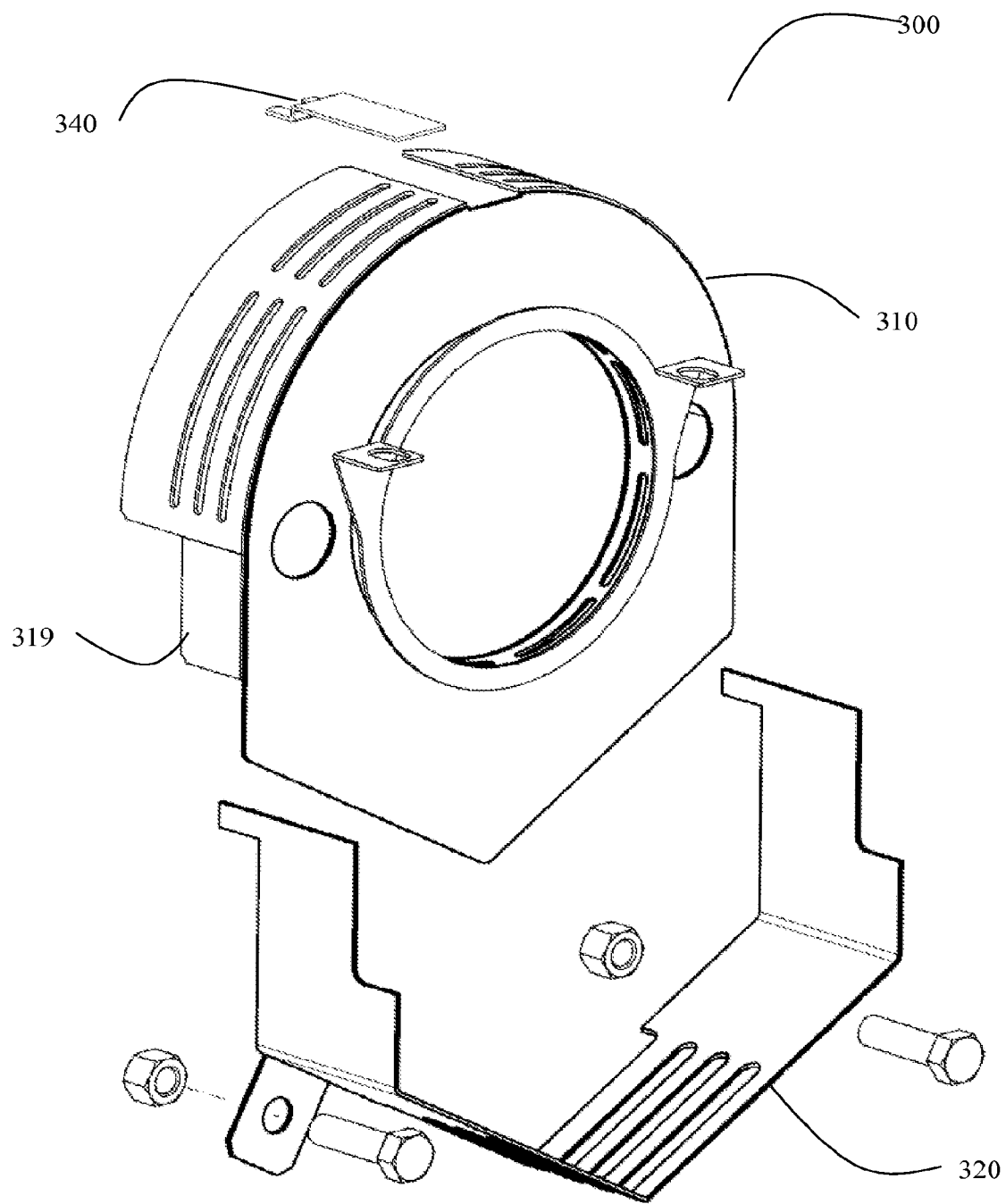
FIG. 18 is an exploded view of the guard of FIG. 16.

Referring to FIGS. 16 to 18, a third embodiment of a guard 300 is shown including an upper element 310, a lower element 320 and a cover piece 340. This embodiment differs from the second embodiment of FIGS. 9 to 15 in that only two apertures 313 are provided for affixing the upper element 310 to the gland follower. Furthermore, the lower element 320 has a "V" shaped profile, rather than a semi-circular profile.

As best seen in FIG. 18, the upper element 310 includes flap portions 319 which overlap with the side portions of the lower element 320. The flap portions 319 help to avoid a gap opening up between the guard elements 310, 320 as they move in relation to one another to obstruct access through the guard.

The operation of the third embodiment is otherwise similar to the second described embodiment with the upper element 310 moving with the gland seal and the lower element 320 being affixed to the pump base.

The various guard element components described above may be formed by stamping a flat sheet of mild steel and painted, for example.

It can be seen that embodiments of the invention have at least one of the following advantages:

Adjustment of a gland seal may be made without the need to remove the pump guard or the need to stop the pump.

The guard adjusts to accommodate operational adjustments made to the pump.

Inspection apertures allow for visual inspection of the gland seal and also allow for escape of liquid from the region of the gland seal.

Any reference to prior art contained herein is not to be taken as an admission that the information is common general knowledge, unless otherwise indicated.

In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose. Terms such as "left" and right", "front" and "rear", "above" and "below" and the like are used as words of convenience to provide reference points and are not to be construed as limiting terms.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

In addition, the foregoing describes only some embodiments of the invention(s), and alterations, modifications, additions and/or changes can be made thereto without departing from the scope and spirit of the disclosed embodiments, the embodiments being illustrative and not restrictive.

Furthermore, invention(s) have been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention(s). Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

The invention claimed is:

1. A guard for a rotary pump,
   a. the pump having a main body and further including an impeller housing and a driveshaft extending between the main body of the pump and the impeller housing;
   b. the pump further including an adjustable sealing arrangement provided at a region where the driveshaft enters the impeller housing, the adjustable sealing arrangement including a gland follower; and wherein the guard is arranged to be attached to the gland follower, and
      wherein the guard provides access to adjust the sealing arrangement but obstructs access to the driveshaft.

2. A guard according to claim 1, wherein the guard accommodates changes in the adjustment of the gland follower by way of being formed from at least two guard elements which are arranged to move with respect to one another.

3. A guard according to claim 1 wherein the main body of the pump includes a pump base and the guard is further arranged to be attached to the pump base and is arranged to accommodate changes in the distance between the gland follower and the pump base.

4. A guard according to claim 1 wherein the main body of the pump includes a bearing housing and the guard is further arranged to be attached to the bearing housing and is arranged to accommodate changes in the distance between the gland follower and the bearing housing.

5. A guard according to claim 1, wherein the guard is formed from three guard elements which are arranged to move with respect to one another.

6. A guard according to claim 5, wherein the guard elements are each comprised of two half-shells which fit together.

7. A guard according to claim 1 including apertures to accommodate bolt ends of the adjustable sealing arrangement.

8. A guard according to claim 1 including apertures to allow visual inspection of the sealing arrangement.

9. A rotary pump including a guard according to claim 1.

10. A method of retrofitting a guard to a rotary pump including the steps of providing a guard according to claim 1 and installing the guard on the pump.

11. A rotary pump, the pump having a main body and further including an impeller housing and a driveshaft extending between the main body of the pump and the impeller housing; the pump further including an adjustable sealing arrangement provided at a region where the driveshaft enters the impeller housing, the adjustable sealing arrangement including a gland seal, an adjustable gland follower and bolt ends projecting from the gland follower; the pump further including a guard, the guard provides access to adjust the sealing arrangement but obstructs access to the driveshaft, the guard includes at least two guard elements, one of the elements is attached to the main body of the pump, the other element is attached to the gland follower, and the guard further including apertures to accommodate the bolt ends of the adjustable sealing arrangement.

12. A guard for a rotary pump,
   a. the pump having a main body and further including an impeller housing and a driveshaft extending between the main body of the pump and the impeller housing;
   b. the pump further including an adjustable sealing arrangement provided at a region where the driveshaft enters the impeller housing,
   wherein the guard is formed from at least two guard elements which are arranged to move with respect to one another, the guard elements each comprised of two half-shells which fit together, and wherein the guard provides access to adjust the sealing arrangement but obstructs access to the driveshaft.

13. The guard according to claim 12, wherein the adjustable sealing arrangement includes a gland follower and the guard is arranged to be attached to the gland follower.

14. The guard according to claim 13, wherein the main body of the pump includes a pump base and the guard is further arranged to be attached to the pump base and is arranged to accommodate changes in the distance between the gland follower and the pump base.

15. The guard according to claim 13, wherein the main body of the pump includes a bearing housing and the guard is further arranged to be attached to the bearing housing and is arranged to accommodate changes in the distance between the gland follower and the bearing housing.

16. The guard according to claim 12, including apertures to accommodate bolt ends of the adjustable sealing arrangement.

17. The guard according to claim 12, including apertures to allow visual inspection of the sealing arrangement.

18. A rotary pump including a guard according to claim 12.

* * * * *